United States Patent [19]
Chang

[11] Patent Number: 5,918,729
[45] Date of Patent: Jul. 6, 1999

[54] CHAIN TENSIONING DEVICE FOR BINDERY LINES

[75] Inventor: Bobby Chang, West Lake Village, Calif.

[73] Assignee: R. R. Donnelley & Sons Company, Chicago, Ill.

[21] Appl. No.: 08/920,502

[22] Filed: Aug. 29, 1997

[51] Int. Cl.[6] .................................................. B65G 23/44
[52] U.S. Cl. .................. 198/810.04; 198/644; 270/52.14
[58] Field of Search ............................... 198/813, 810.04, 198/810.01, 644; 474/104, 110, 114, 113; 270/52.22, 52.14

[56] References Cited

U.S. PATENT DOCUMENTS

| | | | |
|---|---|---|---|
| 2,054,443 | 9/1936 | Pierson | 149/8 |
| 3,140,975 | 7/1964 | Corbin | 162/273 |
| 3,329,561 | 7/1967 | Rojecki et al. | 162/273 |
| 3,413,865 | 12/1968 | Nimtz et al. | 74/242.9 |
| 3,463,022 | 8/1969 | Miller | 74/227 |
| 3,537,573 | 11/1970 | Tangye et al. | 198/813 |
| 3,923,151 | 12/1975 | Weber | 198/813 |
| 3,963,115 | 6/1976 | Teske et al. | 198/813 |
| 3,986,407 | 10/1976 | Naggert | 74/242.1 |
| 4,007,826 | 2/1977 | Brown, Jr. et al. | 198/813 |
| 4,051,742 | 10/1977 | Johansson et al. | 74/241 |
| 4,372,172 | 2/1983 | Gombocz et al. | 73/862.39 |
| 4,411,182 | 10/1983 | Borzym | 83/319 |
| 4,641,744 | 2/1987 | Spisak | 198/813 |
| 4,657,131 | 4/1987 | Brychta et al. | 198/810 |
| 4,758,207 | 7/1988 | Jepsen | 474/101 |
| 4,881,929 | 11/1989 | Randles | 474/111 |
| 5,131,528 | 7/1992 | Bandy, Jr. | 198/813 |
| 5,143,206 | 9/1992 | Hoover | 198/810 |
| 5,632,372 | 5/1997 | Steinbuchel, IV et al. | 198/813 |
| 5,733,214 | 3/1998 | Shiki et al. | 474/110 |

Primary Examiner—Joseph E. Valenza
Assistant Examiner—Patrick Mackey
Attorney, Agent, or Firm—Fitch, Even, Tabin & Flannery

[57] ABSTRACT

A bindery gathering chain and conveyor apparatus with a first and second idling sprocket mounted in fixed relation to one another to define first and second fixed reference points and an endless conveyor chain which rides on the first and second idling sprockets and a moveable support located relative to the first and second fixed reference points. A third sprocket is attached to the moveable support and also has the endless conveyor chain riding on it. There is an actuator moving the moveable support and the third sprocket to apply a first force to the moveable support for a high chain-tensioning mode of operation during start or stop for a predetermined period and also to move the moveable support and the third sprocket to provide a second, lower force for a lower chain-tensioning mode of operation during other operating modes.

20 Claims, 3 Drawing Sheets

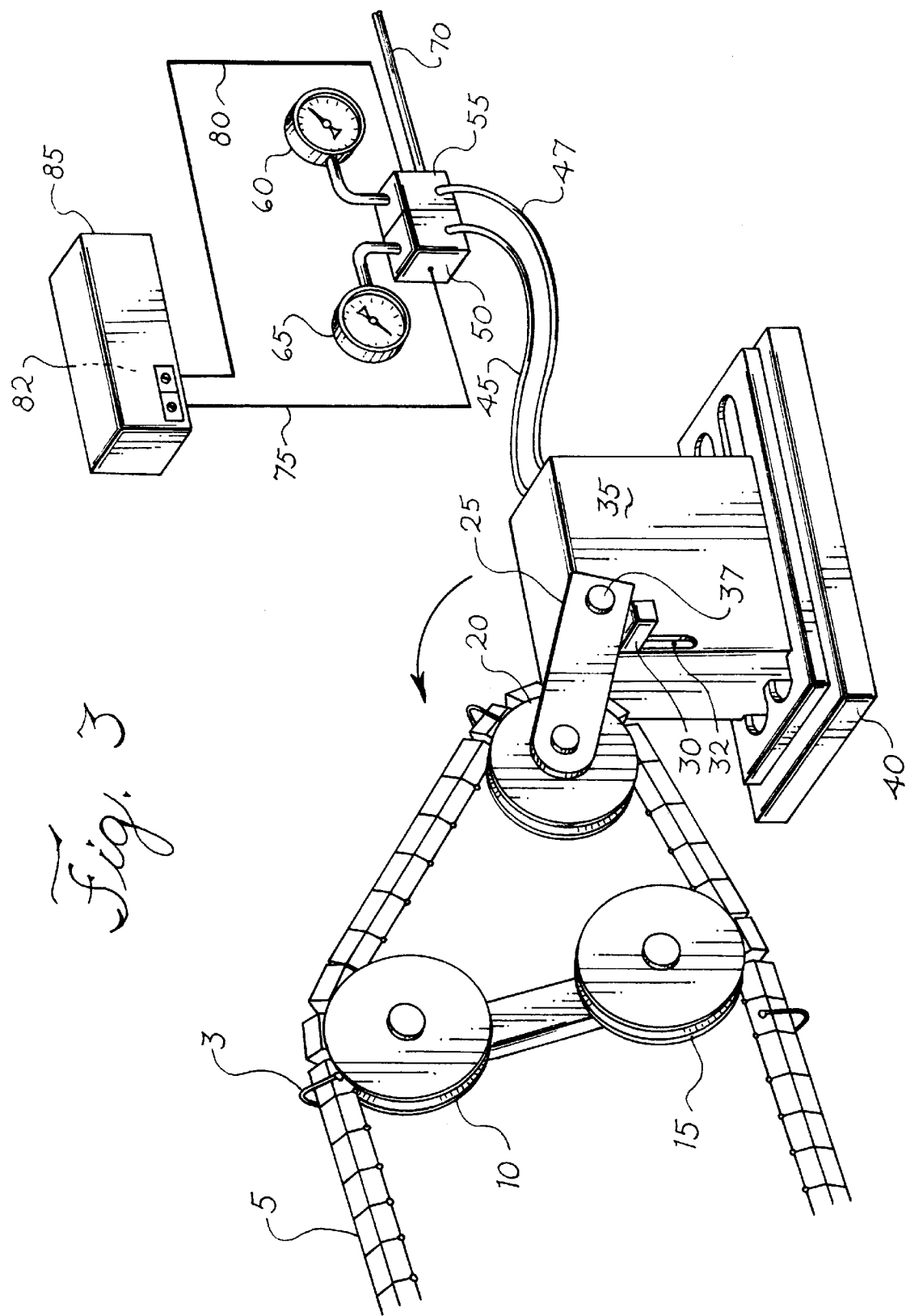

CHAIN TENSIONING DEVICE FOR BINDERY LINES

TECHNICAL FIELD

The present invention relates generally to gathering chains for bindery lines, and more particularly to a gathering chain exhibiting "chain stretch".

BACKGROUND ART

A conveyor is frequently used to move signatures between a number of operating stations. Signatures typically comprise one or more pages which are formed into books, such as catalogs, magazines, pamphlets, etc. The operating stations, which are supplied with signatures by the conveyor, perform selected operations upon those signatures, including collating, trimming, binding and the like.

One known conveyor for conveying signatures to various operating stations includes a continuous chain which is propelled by one or more motor driven sprockets. In the past these continuous chains have been comparatively short needing to be only long enough to accommodate 8 to 10 signature insertion points. In such a system it was necessary to occasionally increase chain tension to take up slack which could cause the chain to jump sprocket teeth and thereby lose timing of the system.

More recently these continuous chains and conveyor systems have reached lengths that are up to three times longer than in the past. As a result the tension applied to maintain the chain timing has also tripled and the necessity to increase the tension occurs much more often with the resulting increase in chain wear, chain stretch and eventually chain replacement. Proper tensioning of an endless conveyor during operation is an important consideration for smooth and efficient operation as well as minimizing wear. Slack in the conveyor is not desirable since it results in erratic movement and undue wear, while too much tension in the chain also results in excessive wear (due to strain and over/stressing) as well as "chain stretch" which is a lengthening of a chain due to tensile forces and/or wear applied over time.

SUMMARY OF THE INVENTION

A general object of the present invention is to provide a new and improved conveying apparatus which attends to the problem of proper tensioning of the endless conveyor during operation while concurrently solving the problem of "chain stretch".

This is accomplished by providing a simple and low cost means of controlling the change between high and low tension depending on where in the operating cycle the conveyor may be. For example, cycle points such as start, speed up, run, slow down, and stop.

More specifically, according to one aspect of the present invention, a gathering chain of a conveyor apparatus includes two idling sprockets mounted in fixed relation to one another in order to define two reference points. An endless conveyor chain rides on these two idling sprockets as well as a third sprocket mounted on a moveable support. The moveable support includes an actuator and a pivoting member. The pivoting member is secured to both the moveable support and actuator so as to cause the moveable support to pivot relative to the defined two reference points thereby being able to move the moveable support in such a manner as to apply a force to the endless chain for a high chain-tensioning mode of operation at all times except during the running of the conveyor apparatus. The actuator will also move the support and third sprocket to provide a lower force for a lower chain-tensioning mode of operation in the same manner as described for high tension. In the low tension mode however, a low tension stop is supplied in order to limit the movement of the support. This low tension stop includes adjustment means which allows adjustment of a minimum tension position.

According to another aspect of the present invention, the actuator is a pneumatic actuator, mounted on a base which has means for longitudinal adjustment thereby increasing the range of possible tension settings of the third sprocket and moveable support. The pneumatic actuator also includes a high pressure indicator in a high chain-tension line and a low pressure indicator in a low chain-tension line.

According to yet another aspect of the present invention the conveyor apparatus includes an electronic control system such as a Programmable Logic Controller (PLC) capable of recognizing the various operating modes of the system such as start, speed up, run, slow down and stop. The PLC includes a timer which can be programmed to establish a time period for the high-tensioning mode of operation and a different time period for the low-tensioning mode of operation.

BRIEF DESCRIPTION OF THE DRAWINGS

These and other features and advantages will become more apparent from a detailed consideration of the invention when taken in conjunction with the drawings in which:

FIG. 3 is a fragmentary view of the low tensioning mode of the conveyor system of FIG. 1.

DETAILED DESCRIPTION OF THE PREFERRED EMBODIMENTS

Figure 1:
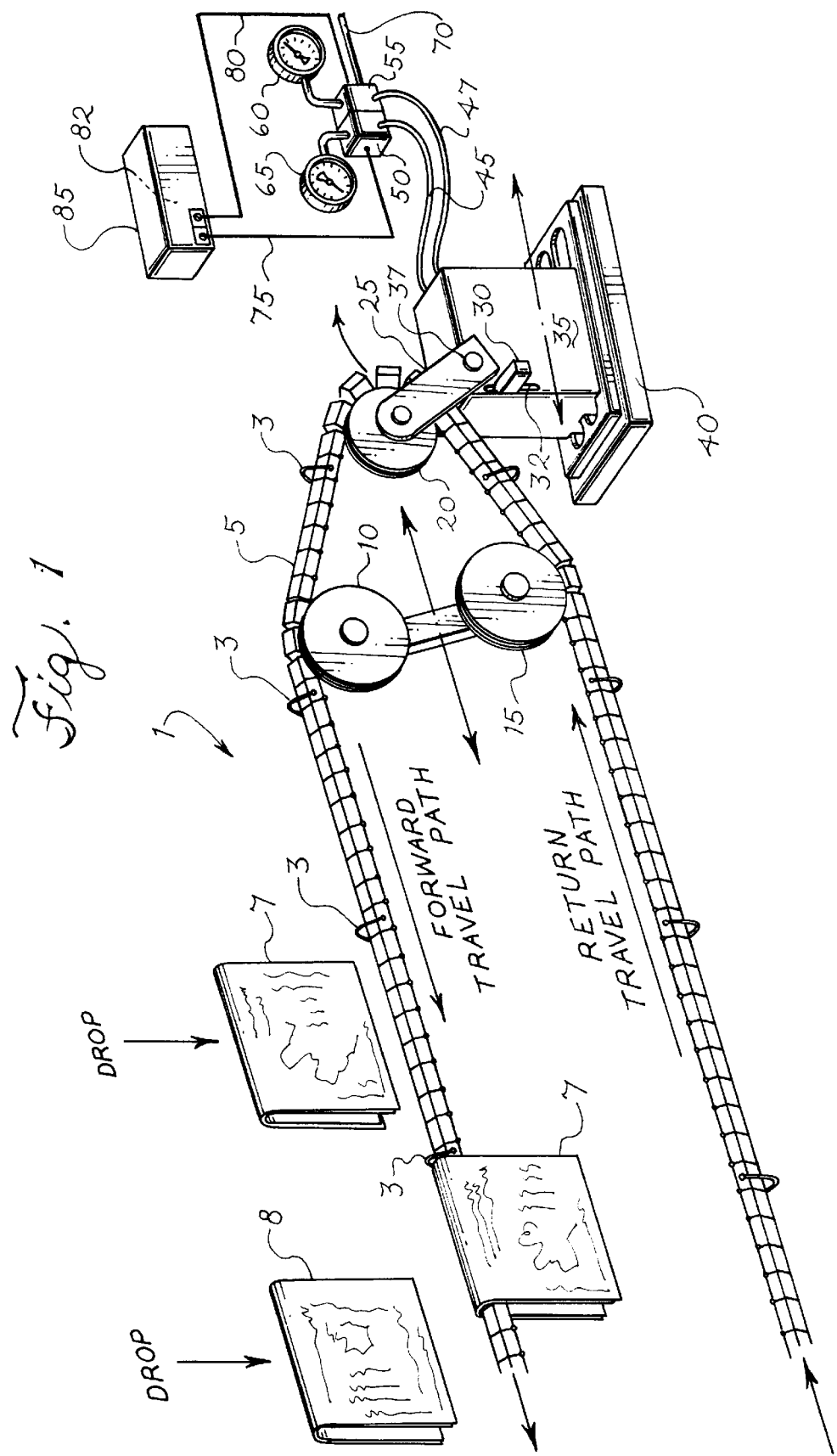
FIG. 1 is an isometric fragmentary view of a portion of a conveyor system with signatures being gathered thereon.

The gathering chain conveyor system 1 shown in FIG. 1 includes a conveyor chain 5. The conveyor chain 5, for example, may be a #40 DIAMOND bindery chain supplied by Diamond Chain Co. of Indianapolis, Ind. Inserted through corresponding openings in the segments of the conveyor chain 5 are chain pins 3 which gather and move signatures 7 and 8 during movement of the conveyor chain 5. The gathering chain conveyor system 1 may have sprockets (not shown) driven by motors (also not shown). These motors drive the conveyor chain 5 and the chain pins 3 to move signatures 7 and 8 between various operating stations which perform operations on the signatures 7 and 8 including the addition of more signatures if necessary.

The conveyor chain forms a closed loop (or infinite chain) and the return travel path is guided through a second idling sprocket 15, a tension sprocket 20, and a first idling sprocket 10 before it resumes its forward travel path.

During normal operation of the gathering chain conveyor system 1 there may be a multiplicity of starts, stops, slow running and normal running. In order to preserve the timing of the system a proper chain tension is applied to conveyor chain 5 by the position of the tension sprocket 20 which is mounted on a support in the form of a tensioning sprocket pivot arm 25 which in turn is rotatably mounted to an actuator 35 via a pivoting member 37. Therefore, depending upon the amount of tension desired, the tensioning sprocket pivot arm 25 will be in different positions with respect to the first and second idling sprockets 10 and 15 respectively.

Figure 2:
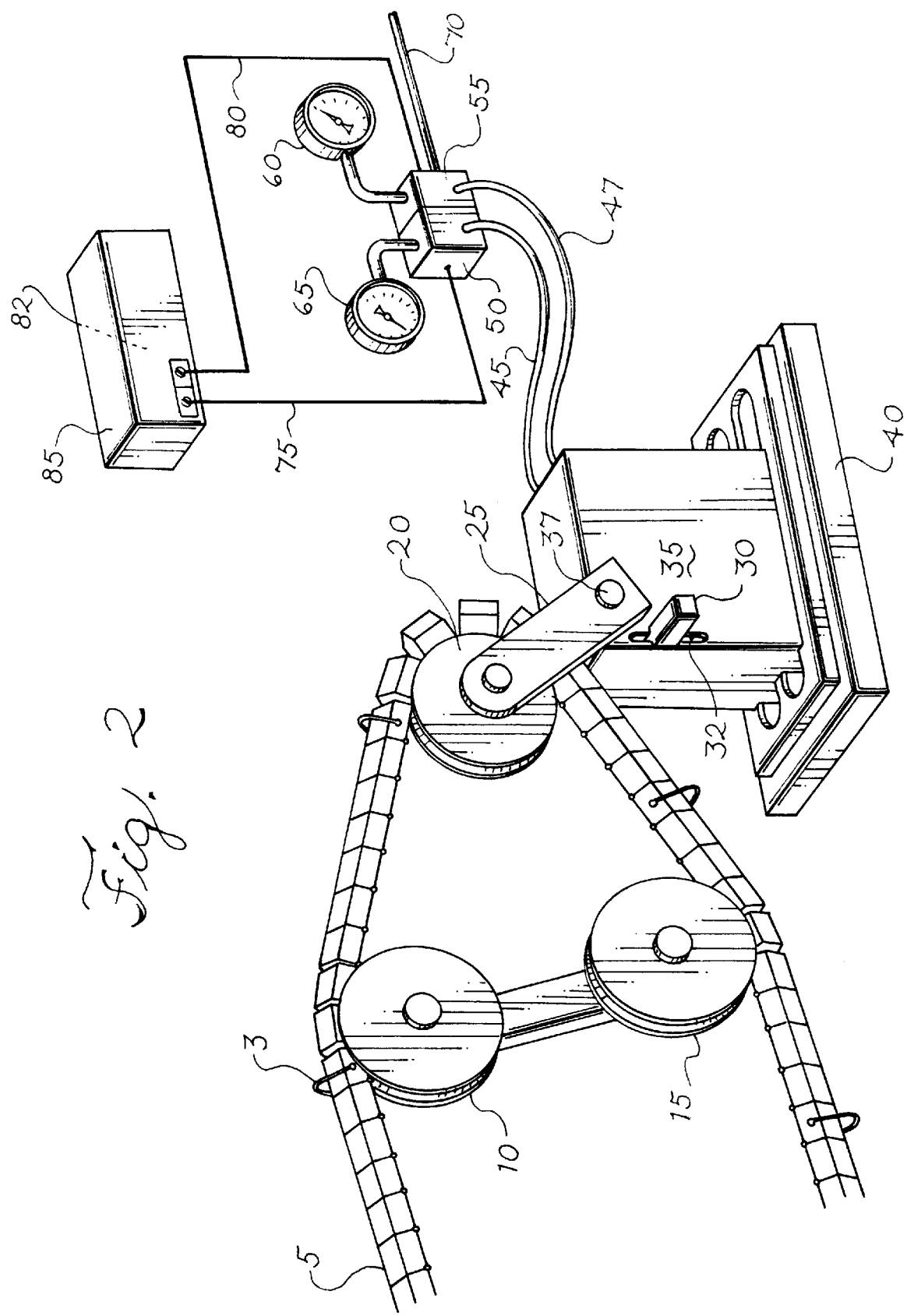
FIG. 2 is a fragmentary view of the high tensioning mode of the conveyor system of FIG. 1.

Referring to FIG. 2, tensioning sprocket pivot arm 25 and tensioning sprocket 20 are shown in the high tensioning position with respect to first and second idling sprockets 10 and 15 respectively. This is the normal position until approximately three (3) seconds after an electronic control system 85 receives a start signal. Before start or at stop, high tension is required and therefore a high pressure activate control line 80 activates a high pressure air valve 55 which allows supplied air 70 to flow to a high pressure regulator/indicator 60 at about 60 psi and through a high pressure air line 47 to the actuator 35 thereby moving the tensioning sprocket pivot arm 25 away from a low tension adjustable stop 30 and into the high tension position. This position can be slidably adjusted by moving the actuator 35 along an actuator mounting base 40, thereby obtaining increased tension variability if needed.

Referring to FIG. 3, the tensioning sprocket pivot arm 25 and the tensioning sprocket 20 are shown in the low tensioning position with respect to the first and second idling sprockets 10 and 15 respectively. In this figure the tensioning sprocket pivot arm 25 is shown very close to the minimum tension position since it is almost resting on the low tension adjustable stop 30. As shown in FIG. 3, the stop is adjustable vertically in an elongated slot 32, which serves as an adjustment means for the stop. This low tension adjustable stop 30 would become extremely important in the case of a loss of air pressure. The timing and control of the actuator 35 is under the control of the electronic controller or control system 85 such as a PLC or a computer. \ Low tension normally takes place when the electronic control system 85 receives a slow or normal running signal as opposed to a change of state signal such as speed up, slow down, start or stop. During running only low tension is required and therefore a low pressure activate control line 75 activates a low pressure air valve 50 which allows the supplied air 70 to flow to a low pressure regulator/indicator 65 at about 40 psi and through a low pressure air line 45 to the actuator 35 and thereby moving the tensioning sprocket pivot arm 25 toward the low tension adjustable stop 30.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

What is claimed is:

1. A bindery gathering chain and conveyor apparatus, timed to signature delivery stations, comprising:
    first and second idling sprockets;
    an endless conveyor chain which rides on the first and second idling sprockets;
    a movable tensioning sprocket support located relative to the first and second idling sprockets which define first and second fixed reference points;
    a tension sprocket attached to the tensioning sprocket support and having the endless conveyor chain riding on the tension sprocket;
    an actuator moving the tensioning sprocket support and tension sprocket relative to the first and second idling sprockets to apply a first force thereto for a high chain-tensioning mode of operation and to provide a second, lower force for a lower chain-tensioning mode of operation; and
    a controller for controlling the actuator to provide the first force and the second lower force during the respective modes of operation;
    an actuator for holding the tension sprocket in the high tension position when the conveyor chain is stopped to take up slack in the conveyor chain;
    said actuator maintaining the tension sprocket in the high tension position upon receipt of a start signal from the controller as the conveyor chain begins running;
    after the conveyor chain is running, the controller operating the actuator to shift the tension sprocket to a low tension position to reduce the chain tension for normal running operation;
    the controller operating the actuator to a high tension position for a subsequent change of state operations including the stopping of the conveyor chain after a normal running operation.

2. The bindery gathering chain and conveyor apparatus of claim 1 wherein the tensioning sprocket support includes a pivoting member, mounting the tension sprocket for movement relative to the first and second idling sprockets which are at fixed reference points.

3. The bindery gathering chain and conveyor apparatus of claim 1 wherein the tensioning sprocket support can move the tensioning sprocket relative to the first and second idling sprockets between a minimum tension position and a maximum tension position;
    and a fail safe stop, limiting the movement to define a minimum tension position adjacent the low tension position.

4. The bindery gathering chain and conveyor apparatus of claim 3 wherein an adjustment means for the low tension stop is available for adjustment of the minimum tension position.

5. A bindery gathering chain and conveyor apparatus, timed to signature delivery stations, comprising:
    first and second idling sprockets mounted in fixed relation to one another to define first and second fixed reference points;
    an endless conveyor chain which rides on the first and second idling sprockets;
    a tensioning sprocket support located relative to the first and second fixed reference points;
    a tension sprocket attached to the tensioning sprocket support and having the endless conveyor chain riding on the tension sprocket;
    a pneumatic actuator using a first predetermined air pressure to move the tensioning sprocket support and the tension sprocket thereon and to apply a first force thereto for a high chain-tensioning mode of operation during rest, start or stop and a second low air pressure to move the tensioning sprocket support and to apply a second, lower force for the tension sprocket to provide a lower chain-tensioning mode of operation during other operating modes.

6. The bindery gathering chain and conveyor apparatus of claim 5 wherein the actuator is a pneumatic actuator which comprises a high pneumatic pressure indicator in a high chain-tension line;
    and a low pneumatic pressure indicator in a low chain-tension line.

7. The bindery gathering chain and conveyor apparatus of claim 5 wherein the tensioning sprocket support includes a moving member secured to both the tensioning sprocket support and the actuator so as to cause the tensioning sprocket support to move relative to the first and second fixed reference points.

8. The bindery gathering chain and conveyor apparatus of claim 5 wherein the tensioning sprocket support can move between a minimum tension position and a maximum tension position;

and a minimum tension stop limiting the movement of the tensioning sprocket support to define the minimum tension position.

9. The bindery gathering chain and conveyor apparatus of claim 8 wherein an adjustment means for the low tension stop allows adjustment of the minimum tension position.

10. A bindery gathering chain and conveyor apparatus, timed to signature delivery stations, comprising:

first and second idling sprockets mounted in fixed relation to one another to define first and second fixed reference points;

an endless conveyor chain which rides on the first and second idling sprockets;

a tensioning sprocket support located relative to the first and second fixed reference points;

a tension sprocket attached to the tensioning sprocket support and having the endless conveyor chain riding on the tension sprocket;

a pneumatic actuator moving the tensioning sprocket support and the tension sprocket to apply a first predetermined force thereto for a high chain-tensioning mode of operation during rest, start or stop and also to move the tensioning sprocket support and the tension sprocket to provide a second, lower predetermined force for a lower chain-tensioning mode of operation during other operating modes; and a fail safe tension stop positioned adjacent the tensioning sprocket support and cooperating therewith if the actuator should fail to stop movement of the tensioning sprocket support at a minimum tensioning position adjacent the low tensioning position.

11. The bindery gathering chain and conveyor apparatus of claim 10 including a base to provide means for longitudinally adjusting the pneumatic actuator thereon.

12. The bindery gathering chain and conveyor apparatus of claim 10 wherein the pneumatic actuator comprises a high pneumatic pressure indicator in a high chain-tension line; and a low pneumatic pressure indicator in a low chain-tension line.

13. The bindery gathering chain and conveyor apparatus of claim 10 wherein the tensioning sprocket pivot arm includes a pivoting member secured to both the tensioning sprocket pivot arm and the actuator so as to cause the tensioning sprocket pivot arm to pivot relative to the first and second fixed reference points.

14. The bindery gathering chain and conveyor apparatus of claim 10 wherein the tensioning sprocket support comprises a pivot arm moves between a minimum tension position and a maximum tension position;

and the minimum tension stop limiting the movement of the tensioning sprocket pivot arm to define the minimum tension position.

15. The bindery gathering chain and conveyor apparatus of claim 14 wherein an adjustment means for the low tension stop allows adjustment of the minimum tension position.

16. A bindery gathering chain and conveyor apparatus, timed to signature delivery stations, comprising:

first and second idling sprockets mounted in fixed relation to one another to define first and second fixed reference points;

an endless conveyor chain which rides on the first and second idling sprockets;

a tensioning sprocket support located relative to the first and second fixed reference points;

a tension sprocket attached to the tensioning sprocket support and having the endless conveyor chain riding on the tension sprocket;

a pneumatic actuator moving the tensioning sprocket support and the tension sprocket to apply a first predetermined force thereto for a high chain-tensioning mode of operation during rest, start or stop for a predetermined period and also to move the tensioning sprocket support and the tension sprocket to provide a second, predetermined lower force for a lower chain-tensioning mode of operation during other operating modes;

a base for mounting the pneumatic actuator for sliding movement for shifting the actuator and to shift the location of the tension sprocket relative to the first and second idling sprockets to change the range of motion of the actuator when shifting between high and low forces being applied to the chain; and an electronic control system which recognizes start up and stop modes and switches the pneumatic actuator between the high chain-tensioning mode and the low chain-tensioning mode.

17. The bindery gathering chain and conveyor apparatus of claim 16 including means for longitudinally adjusting the base and the pneumatic actuator thereon to provide increased range of tension adjustment in the endless conveyor chain.

18. The bindery gathering chain and conveyor apparatus of claim 16 wherein the electronic control system includes a Programmable Logic Controller (PLC) or computer.

19. The bindery gathering chain and conveyor apparatus of claim 18 wherein the electronic control system includes an internal computerized timer which causes the pneumatic actuator to operate in the high chain-tensioning mode for a first time period and causes the pneumatic actuator to operate in the low chain-tensioning mode for a second time period.

20. The bindery gathering chain and conveyor apparatus of claim 19 wherein the first time period occurs during rest, start and stop of the gathering conveyor apparatus and the second time period occurs during other modes of operation of the gathering conveyor apparatus.

* * * * *

UNITED STATES PATENT AND TRADEMARK OFFICE
CERTIFICATE OF CORRECTION

PATENT NO.   : 5,918,729                                        Page 1 of 1
DATED        : July 6, 1999
INVENTOR(S)  : Bobby Chang It is certified that error appears in the above-identified patent and that said Letters Patent is hereby corrected as shown below:

Column 3,
Line 67, delete "and".

Column 4,
Line 14, after "operation;" insert -- and --.
Line 16, change "operations" to -- operation --.
Line 28, after "position;" insert -- and --.
Line 29, delete "and".
Line 61, after "line;" insert -- and --.
Line 62, delete "and".

Column 5,
Line 6, after "position;" insert -- and --.
Line 7, delete "and".
Line 57, after "position" insert -- and --.
Line 58, delete "and".

Signed and Sealed this

Nineteenth Day of February, 2002

Attest:

*Attesting Officer*

JAMES E. ROGAN
*Director of the United States Patent and Trademark Office*